United States Patent
Farrow et al.

(10) Patent No.: US 10,050,404 B2
(45) Date of Patent: Aug. 14, 2018

(54) FIBER SOURCE WITH CASCADED GAIN STAGES AND/OR MULTIMODE DELIVERY FIBER WITH LOW SPLICE LOSS

(71) Applicant: nLIGHT, Inc., Vancouver, WA (US)

(72) Inventors: Roger L. Farrow, Vancouver, WA (US); Dahv A. V. Kliner, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/074,838

(22) Filed: Mar. 18, 2016

(65) Prior Publication Data

US 2016/0285227 A1   Sep. 29, 2016

Related U.S. Application Data

(60) Provisional application No. 62/138,926, filed on Mar. 26, 2015.

(51) Int. Cl.
*H01S 3/067* (2006.01)
*G02B 6/255* (2006.01)
(Continued)

(52) U.S. Cl.
CPC .......... *H01S 3/0675* (2013.01); *G02B 6/2551* (2013.01); *G02B 6/264* (2013.01); *G02B 6/4296* (2013.01); *H01S 3/06754* (2013.01)

(58) Field of Classification Search
CPC .. H01S 3/067; H01S 3/06754; H01S 3/06758; H01S 3/06783; G02B 6/14; G02B 6/262; G02B 6/02004; G02B 6/02009
See application file for complete search history.

(56) References Cited

U.S. PATENT DOCUMENTS

| | | | |
|---|---|---|---|
| 4,138,190 A | 2/1979 | Bryngdahl | |
| 4,252,403 A | 2/1981 | Salisbury | |

(Continued)

FOREIGN PATENT DOCUMENTS

| | | |
|---|---|---|
| DE | 4200587 | 4/1993 |
| DE | 10321102 | 12/2004 |

(Continued)

OTHER PUBLICATIONS

International Search Report and Written Opinion for related International Application No. PCT/US2016/041526, 6 pages, dated Oct. 20, 2016.

(Continued)

*Primary Examiner* — Eric L Bolda
(74) *Attorney, Agent, or Firm* — Klarquist Sparkman, LLP

(57) ABSTRACT

An apparatus includes an optical gain fiber having a core, a cladding surrounding the core, the core and cladding defining an optical gain fiber numerical aperture, and a multimode fiber having a core with a larger radius than a radius of the optical gain fiber core, a cladding surrounding the core, the core and cladding of the multimode fiber defining a multimode fiber stable numerical aperture that is larger than the optical gain fiber numerical aperture, the multimode fiber being optically coupled to the optical gain fiber so as to receive an optical beam propagating in the optical gain fiber and to stably propagate the received optical beam in the multimode fiber core with low optical loss associated with the optical coupling.

25 Claims, 4 Drawing Sheets

(51) Int. Cl.
*G02B 6/42* (2006.01)
*G02B 6/26* (2006.01)

(56) References Cited

U.S. PATENT DOCUMENTS

| | | | |
|---|---|---|---|
| 4,266,851 A | 5/1981 | Salisbury | |
| 4,475,027 A | 10/1984 | Pressley | |
| 4,998,797 A * | 3/1991 | van den Bergh | G02B 6/262 385/55 |
| 5,153,773 A | 10/1992 | Muraki et al. | |
| 5,463,497 A | 10/1995 | Muraki et al. | |
| 5,475,415 A | 12/1995 | Noethen | |
| 5,745,284 A | 4/1998 | Goldberg et al. | |
| 5,818,630 A * | 10/1998 | Fermann | H01S 3/067 359/340 |
| 5,864,430 A | 1/1999 | Dickey et al. | |
| 5,903,696 A | 5/1999 | Krivoshlykov | |
| 5,909,306 A | 6/1999 | Goldberg et al. | |
| 598,680 A | 11/1999 | Fork | |
| 5,999,548 A | 12/1999 | Mori et al. | |
| 6,072,184 A | 6/2000 | Okino et al. | |
| 6,132,104 A | 10/2000 | Bliss et al. | |
| 6,330,382 B1 * | 12/2001 | Harshbarger | G02B 6/14 385/123 |
| 6,433,301 B1 | 8/2002 | Dunsky et al. | |
| 6,434,177 B1 | 8/2002 | Jurgensen | |
| 6,483,973 B1 | 11/2002 | Mazzarese et al. | |
| 6,496,301 B1 | 12/2002 | Koplow et al. | |
| 6,542,665 B2 | 4/2003 | Reed et al. | |
| 6,556,340 B1 | 4/2003 | Wysocki et al. | |
| 6,639,177 B2 | 10/2003 | Ehrmann et al. | |
| 6,671,293 B2 | 12/2003 | Kopp et al. | |
| 6,711,918 B1 | 3/2004 | Kliner et al. | |
| 6,724,528 B2 | 4/2004 | Koplow et al. | |
| 6,772,611 B2 | 8/2004 | Kliner et al. | |
| 6,777,645 B2 | 8/2004 | Ehrmann et al. | |
| 6,801,550 B1 | 10/2004 | Snell et al. | |
| 6,825,974 B2 | 11/2004 | Kliner et al. | |
| 6,839,163 B1 | 1/2005 | Jakobson et al. | |
| 6,882,786 B1 | 4/2005 | Kliner et al. | |
| 6,895,154 B2 | 5/2005 | Johnson et al. | |
| 6,917,742 B2 | 7/2005 | Po | |
| 6,941,053 B2 | 9/2005 | Lauzon et al. | |
| 6,963,062 B2 | 11/2005 | Cyr et al. | |
| 6,989,508 B2 | 1/2006 | Ehrmann et al. | |
| 7,068,900 B2 | 6/2006 | Croteau et al. | |
| 7,079,566 B2 | 7/2006 | Kido et al. | |
| 7,116,887 B2 | 10/2006 | Farroni et al. | |
| 7,148,447 B2 | 12/2006 | Ehrmann et al. | |
| 7,151,787 B2 | 12/2006 | Kulp et al. | |
| 7,157,661 B2 | 1/2007 | Amako | |
| 7,170,913 B2 | 1/2007 | Araujo et al. | |
| 7,184,630 B2 | 2/2007 | Kwon et al. | |
| 7,235,150 B2 | 6/2007 | Bischel et al. | |
| 7,257,293 B1 | 8/2007 | Fini et al. | |
| 7,317,857 B2 | 1/2008 | Manyam et al. | |
| 7,359,604 B2 | 4/2008 | Po | |
| 7,382,389 B2 | 6/2008 | Cordingley et al. | |
| 7,394,476 B2 | 7/2008 | Cordingley et al. | |
| 7,421,175 B2 | 9/2008 | Varnham | |
| 7,527,977 B1 | 5/2009 | Fruetel et al. | |
| 7,537,395 B2 | 5/2009 | Savage-Leuchs | |
| 7,592,568 B2 * | 9/2009 | Varnham | B23K 26/0734 219/121.73 |
| 7,593,435 B2 | 9/2009 | Gapontsev et al. | |
| 7,764,854 B2 | 7/2010 | Fini | |
| 7,783,149 B2 | 8/2010 | Fini | |
| 7,835,608 B2 | 11/2010 | Minelly et al. | |
| 7,876,495 B1 | 1/2011 | Minelly | |
| 7,880,961 B1 | 2/2011 | Feve et al. | |
| 7,920,767 B2 | 4/2011 | Fini | |
| 7,924,500 B1 | 4/2011 | Minelly | |
| 7,925,125 B2 | 4/2011 | Cyr et al. | |
| 7,955,905 B2 | 6/2011 | Cordingley et al. | |
| 7,955,906 B2 | 6/2011 | Cordingley et al. | |
| 8,027,555 B1 | 9/2011 | Kliner et al. | |
| 8,217,304 B2 | 7/2012 | Cordingley et al. | |
| 8,243,764 B2 | 8/2012 | Tucker et al. | |
| 8,270,441 B2 * | 9/2012 | Rogers | H01S 3/06754 359/341.1 |
| 8,270,445 B2 | 9/2012 | Morasse et al. | |
| 8,278,591 B2 | 10/2012 | Chouf et al. | |
| 8,288,683 B2 | 10/2012 | Jennings et al. | |
| 8,362,391 B2 | 1/2013 | Partlo et al. | |
| 8,395,084 B2 | 3/2013 | Tanaka | |
| 8,509,577 B2 | 8/2013 | Liu | |
| 8,526,110 B1 | 9/2013 | Honea et al. | |
| 8,542,145 B2 | 9/2013 | Galati | |
| 8,593,725 B2 | 11/2013 | Kliner et al. | |
| 8,711,471 B2 | 4/2014 | Liu et al. | |
| 8,728,591 B2 | 5/2014 | Inada et al. | |
| 8,755,660 B1 | 6/2014 | Minelly | |
| 8,781,269 B2 | 7/2014 | Huber et al. | |
| 8,809,734 B2 | 8/2014 | Cordingley et al. | |
| 8,835,804 B2 | 9/2014 | Farmer et al. | |
| 8,947,768 B2 | 2/2015 | Kliner et al. | |
| 8,953,914 B2 | 2/2015 | Genier | |
| 9,014,220 B2 | 4/2015 | Minelly et al. | |
| 9,136,663 B2 | 9/2015 | Taya | |
| 9,140,873 B2 | 9/2015 | Minelly | |
| 9,158,066 B2 | 10/2015 | Fini et al. | |
| 9,207,395 B2 | 12/2015 | Fini et al. | |
| 9,217,825 B2 | 12/2015 | Ye et al. | |
| 9,250,390 B2 | 2/2016 | Muendel et al. | |
| 9,310,560 B2 | 4/2016 | Chann et al. | |
| 9,322,989 B2 | 4/2016 | Fini et al. | |
| 9,325,151 B1 | 4/2016 | Fini et al. | |
| 9,339,890 B2 | 5/2016 | Woods et al. | |
| 9,366,887 B2 | 6/2016 | Tayebati et al. | |
| 9,397,466 B2 | 7/2016 | McComb et al. | |
| 9,431,786 B2 | 8/2016 | Savage-Leuchs | |
| 9,442,252 B2 | 9/2016 | Genier | |
| 9,507,084 B2 | 11/2016 | Fini et al. | |
| 9,547,121 B2 | 1/2017 | Hou et al. | |
| 9,634,462 B2 | 4/2017 | Kliner et al. | |
| 9,837,783 B2 | 12/2017 | Kliner et al. | |
| 2002/0146202 A1 | 10/2002 | Reed et al. | |
| 2003/0095578 A1 | 5/2003 | Kopp et al. | |
| 2003/0118305 A1 | 6/2003 | Reed et al. | |
| 2003/0219208 A1 | 11/2003 | Kwon et al. | |
| 2004/0208464 A1 | 10/2004 | Po | |
| 2005/0041697 A1 | 2/2005 | Seifert et al. | |
| 2005/0185892 A1 | 8/2005 | Kwon et al. | |
| 2005/0265678 A1 | 12/2005 | Manyam et al. | |
| 2006/0024001 A1 | 2/2006 | Kobayashi | |
| 2006/0067632 A1 | 3/2006 | Broeng et al. | |
| 2006/0219673 A1 | 10/2006 | Varnham et al. | |
| 2006/0291788 A1 | 12/2006 | Po | |
| 2007/0104438 A1 | 5/2007 | Varnham | |
| 2007/0147751 A1 | 6/2007 | Fini | |
| 2007/0178674 A1 | 8/2007 | Imai et al. | |
| 2007/0195850 A1 | 8/2007 | Schluter et al. | |
| 2009/0034059 A1 | 2/2009 | Fini | |
| 2009/0059353 A1 | 3/2009 | Fini | |
| 2009/0080835 A1 * | 3/2009 | Frith | G02B 6/14 385/50 |
| 2009/0152247 A1 | 6/2009 | Jennings et al. | |
| 2010/0067013 A1 | 3/2010 | Howieson et al. | |
| 2010/0067860 A1 | 3/2010 | Ikeda et al. | |
| 2010/0129029 A1 | 5/2010 | Westbrook | |
| 2010/0150186 A1 | 6/2010 | Mizuuchi | |
| 2011/0091155 A1 | 4/2011 | Yilmaz et al. | |
| 2011/0163077 A1 | 7/2011 | Partlo et al. | |
| 2011/0248005 A1 | 10/2011 | Briand et al. | |
| 2011/0305256 A1 | 12/2011 | Chann | |
| 2012/0002919 A1 | 1/2012 | Liu | |
| 2012/0051692 A1 * | 3/2012 | Seo | G02B 6/2852 385/28 |
| 2012/0168411 A1 | 7/2012 | Farmer et al. | |
| 2012/0262781 A1 * | 10/2012 | Price | G02B 6/14 359/341.3 |
| 2013/0038923 A1 | 2/2013 | Jespersen et al. | |
| 2013/0148925 A1 | 6/2013 | Muendel et al. | |
| 2013/0223792 A1 | 8/2013 | Huber et al. | |

(56) References Cited

U.S. PATENT DOCUMENTS

| | | | |
|---|---|---|---|
| 2013/0251324 | A1 | 9/2013 | Fini et al. |
| 2013/0343703 | A1 | 12/2013 | Genier |
| 2014/0086526 | A1 | 3/2014 | Starodubov et al. |
| 2014/0177038 | A1 | 6/2014 | Rrataj et al. |
| 2014/0178023 | A1 | 6/2014 | Oh et al. |
| 2014/0233900 | A1 | 8/2014 | Hugonnot et al. |
| 2014/0268310 | A1 | 9/2014 | Ye et al. |
| 2014/0334788 | A1 | 11/2014 | Fini et al. |
| 2015/0049987 | A1* | 2/2015 | Grasso .............. B23K 26/00 385/33 |
| 2015/0104139 | A1 | 4/2015 | Brunet et al. |
| 2015/0125114 | A1 | 5/2015 | Genier |
| 2015/0125115 | A1 | 5/2015 | Genier |
| 2015/0138630 | A1 | 5/2015 | Honea et al. |
| 2015/0293300 | A1 | 10/2015 | Fini et al. |
| 2015/0293306 | A1 | 10/2015 | Huber et al. |
| 2015/0316716 | A1 | 11/2015 | Fini et al. |
| 2015/0349481 | A1 | 12/2015 | Kliner |
| 2016/0013607 | A1 | 1/2016 | McComb et al. |
| 2016/0097903 | A1 | 4/2016 | Li et al. |
| 2016/0116679 | A1 | 4/2016 | Muendel et al. |
| 2016/0218476 | A1 | 7/2016 | Kliner et al. |
| 2016/0285227 | A1 | 9/2016 | Farrow et al. |
| 2016/0320565 | A1 | 11/2016 | Brown et al. |
| 2016/0320685 | A1 | 11/2016 | Tayebati et al. |
| 2017/0090119 | A1 | 3/2017 | Logan et al. |
| 2017/0110845 | A1 | 4/2017 | Hou et al. |
| 2017/0162999 | A1 | 6/2017 | Saracco et al. |
| 2017/0271837 | A1 | 9/2017 | Hemenway et al. |
| 2017/0336580 | A1 | 11/2017 | Tayebati et al. |

FOREIGN PATENT DOCUMENTS

| | | |
|---|---|---|
| EP | 1266259 | 5/2011 |
| WO | WO 2004/027477 | 4/2004 |
| WO | WO 2013/090236 | 6/2013 |
| WO | WO 2017/008022 | 1/2017 |

OTHER PUBLICATIONS

International Search Report and Written Opinion for related International Application No. PCT/US2016/053807, 6 pages, dated Jan. 19, 2017.

Ghatak et al., "Design of Waveguide Refractive Index Profile to Obtain Flat Model Field", SPIE, 3666:40-44 (Apr. 1999).

Notice of Allowance for related U.S. Appl. No. 14/293,941, 5 pages, dated May 6, 2016.

Office Action for related U.S. Appl. No. 14/293,941, 6 pages, dated May 11, 2015.

Office Action for related U.S. Appl. No. 14/293,941, 9 pages, dated Dec. 1, 2015.

"Triple Clad Ytterbium-Doped Polarization Maintaining Fibers," nuFERN Driven to Light Specifications, 1 page (Jan. 2006).

Varshney et al., "Design of a flat field fiber with very small dispersion slope", *Optical Fiber Technology*, 9(3):189-198 (Oct. 2003).

Adelman et al., "Measurement of Relative State-to-State Rate Constants for the Reaction D + $H_2(v, j) \to HD(v', j')$ + H," *J. Chem. Phys.*, 97:7323-7341 (Nov. 15, 1992).

Alfano et al., "Photodissociation and Recombination Dynamics of $I_2^-$ in Solution," *Ultrafast Phenomena VIII*, (Springer-Verlag, New York), pp. 653-655 (Jan. 1993).

"ARM," Coherent, available at: http://www.corelase.fi/products/arm/, 6 pages, retrieved May 26, 2017.

Bernasconi et al., "Kinetics of Ionization of Nitromethane and Phenylnitromethane by Amines and Carboxylate Ions in $Me_2SO$-Water Mixtures. Evidence of Ammonium Ion-Nitronate Ion Hydrogen Bonded Complex Formation in $Me_2SO$-Rich Solvent Mixtures," *J. Org. Chem.*, 53:3342-3351 (Jul. 1988).

Blake et al., "The H + $D_2$ Reaction: HD(v=1, J) and Hd(v=2, J) Distributions at a Collision Energy of 1.3 eV," *Chem. Phys. Lett.*, 153:365-370 (Dec. 23, 1988).

Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).

Daniel et al., "Novel technique for mode selection in a multimode fiber laser," Optics Express, 19:12434-12439 (Jun. 20, 2011).

Di Teodoro et al., "Diffraction-Limited, 300-kW Peak-Power Pulses from a Coiled Multimode Fiber Amplifier," *Optics Letters*, 27:518-520 (May 2002).

Di Teodoro et al., "Diffraction-limited, 300-kW-peak-power Pulses from a Yb-doped Fiber Amplifier," *Conference on Lasers and Electro-Optics*, OSA Technical Digest (Optical Society of America, Washington, DC), p. 592-593 (May 22-24, 2002).

Di Teodoro et al., "High-peak-power pulsed fiber sources," *Proc. of SPIE*, 5448:561-571 (Sep. 20, 2004).

"Efficient and Simple Precision, Laser Processing Head PDT-B," HIGHYAG, 6 pages, (Jan. 2010).

"ENSIS Series," Amada America, Inc., available at: http://www.amada.com/america/ensis-3015-aj, 2 pages, retrieved May 26, 2017.

"EX-F Series," MC Machinery Systems, Inc., available at: https://www.mcmachinery.com/products-and-solutions/ex-f-series/, 2 pages, retrieved May 26, 2017.

Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages (2006).

Farrow et al., "Compact Fiber Lasers for Efficient High-Power Generation," *Proc. of SPIE*, 6287:62870C-1-62870C-6 (Sep. 1, 2006).

Farrow et al., "Design of Refractive-Index and Rare-Earth-Dopant Distributions for Large-Mode-Area Fibers Used in Coiled High-Power Amplifiers," *Proc. of SPIE*, 6453:64531C-1-64531C-11 (Feb. 2, 2007).

Farrow et al., "High-Peak-Power (>1.2 MW) Pulsed Fiber Amplifier," *Proc. of the SPIE*, 6102:61020L-1-61020L-11 (Mar. 2006).

Farrow et al., "Numerical Modeling of Self-Focusing Beams in Fiber Amplifiers," *Proc. of the SPIE*, 6453:645309-1-645309-9 (2007).

Farrow et al., "Peak-Power Limits on Pulsed Fiber Amplifiers Imposed by Self-Focusing," *Optics Lett.*, 31:3423-3425 (Dec. 1, 2006).

Fève et al., "Four-wave mixing in nanosecond pulsed fiber amplifiers," *Optics Express*, 15:4647-4662 (Apr. 16, 2007).

Fève et al., "Limiting Effects of Four-Wave Mixing in High-Power Pulsed Fiber Amplifiers," *Proc. of the SPIE*, 6453:64531P-1-64531P-11 (Feb. 22, 2007).

Final Office action from U.S. Appl. No. 15/607,411, dated Feb. 1, 2018, 27 pages.

Fini, "Bend-compensated design of large-mode-area fibers," Optics Letters, 31:1963-1965 (Jul. 1, 2006).

Fini, "Large mode area fibers with asymmetric bend compensation," Optics Express, 19:21868-21873 (Oct. 24, 2011).

Fini et al., "Bend-compensated large-mode-area fibers: achieving robust single-modedness with transformation optics," Optics Express, 21:19173-19179 (Aug. 12, 2013).

Fox et al., "Effect of low-earth orbit space on radiation-induced absorption in rare-earth-doped optical fibers," *J. Non-Cryst. Solids*, 378:79-88 (Oct. 15, 2013).

Fox et al., "Gamma Radiation Effects in Yb-Doped Optical Fiber," *Proc. of the SPIE*, 6453:645328-1-645328-9 (Feb. 23, 2007).

Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).

Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).

Fox et al., "Radiation damage effects in doped fiber materials," *Proc. of the SPIE*, 6873:68731F-1-68731F-9 (Feb. 22, 2008).

Fox et al., "Spectrally Resolved Transmission Loss in Gamma Irradiated Yb-Doped Optical Fibers," *IEEE J. Quant. Electron.*, 44:581-586 (Jun. 2008).

(56) References Cited

OTHER PUBLICATIONS

Fox et al., "Temperature and Dose-Rate Effects in Gamma Irradiated Rare-Earth Doped Fibers," *Proc. of SPIE*, 7095:70950B-1-70950B-8 (Aug. 26, 2008).

Ghasemi et al., "Beam shaping design for coupling high power diode laser stack to fiber," *Applied Optics*, 50:2927-2930 (Jun. 20, 2011).

Goers et al., "Development of a Compact Gas Imaging Sensor Employing cw Fiber-Amp-Pumped PPLN OPO," *Conference on Lasers and Electro-Optics*, OSA Technical Digest (Optical Society of America, Washington, DC), p. 521 (May 11, 2001).

Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).

Goldberg et al., "Deep UV Generation by Frequency Quadrupling of a High-Power GaAlAs Semiconductor Laser," *Optics Lett.*, 20:1145-1147 (May 15, 1995).

Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (May 24, 1999).

Goldberg et al., "Highly Efficient 4-W Yb-Doped Fiber Amplifier Pumped by a Broad-Stripe Laser Diode," *Optics Lett.*, 24:673-675 (May 15, 1999).

Goldberg et al., "High-Power Superfluorescent Source with a Side-Pumped Yb-Doped Double-Cladding Fiber," *Optics Letters*, 23:1037-1039 (Jul. 1, 1998).

Goldberg et al., "Tunable UV Generation at 286 nm by Frequency Tripling of a High-Power Modelocked Semiconductor Laser," *Optics Lett.*, 20:1640-1642 (Aug. 1, 1995).

Golub, "Laser Beam Splitting by Diffractive Optics," *Optics and Photonics News*, 6 pages (Feb. 2004).

Han et al., "Reshaping collimated laser beams with Gaussian profile to uniform profiles," *Applied Optics*, 22:3644-3647 (Nov. 15, 1983).

Headrick et al., "Application of laser photofragmentation-resonance enhanced multiphoton ionization to ion mobility spectrometry," *Applied Optics*, 49:2204-2214 (Apr. 10, 2010).

Hemenway et al., "Advances in high-brightness fiber-coupled laser modules for pumping multi-kW CW fiber lasers," *Proceedings of SPIE*, 10086:1008605-1-1008605-7 (Feb. 22, 2017).

Hemenway et al.," High-brightness, fiber-coupled pump modules in fiber laser applications," *Proc. of SPIE*, 8961:89611V-1-89611V-12 (Mar. 7, 2014).

Hoops et al., "Detection of mercuric chloride by photofragment emission using a frequency-converted fiber amplifier," *Applied Optics*, 46:4008-4014 (Jul. 1, 2007).

Hotoleanu et al., "High Order Mode Suppression in Large Mode Area Active Fibers by Controlling the Radial Distribution of the Rare Earth Dopant," *Proc. of the SPIE*, 6102:61021T-1-61021T-8 (Feb. 23, 2006).

"How to Select a Beamsplitter," IDEX—Optics & Photonics Marketplace, available at: https://www.cvilaseroptics.com/file/general/beamSplitters.pdf, 5 pages (Jan. 8, 2014).

Huang et al., "Double-cutting beam shaping technique for high-power diode laser area light source," *Optical Engineering*, 52:106108-1-106108-6 (Oct. 2013).

International Search Report and Written Opinion from International Application No. PCT/US2017/034848, dated Nov. 28, 2017, 15 pages.

Ishiguro et al., "High Efficiency 4-kW Fiber Laser Cutting Machine," *Rev. Laser Eng.*, 39:680-684 (May 21, 2011).

Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).

Johnson et al., "Ultrafast Experiments on the Role of Vibrational Modes in Electron Transfer," *Pure and Applied Chem.*, 64:1219-1224 (May 1992).

Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).

Kliner et al., "4-kW fiber laser for metal cutting and welding," *Proc. of SPIE*, 7914:791418-791418-8 (Feb. 22, 2011).

Kliner et al., "Comparison of Experimental and Theoretical Absolute Rates for Intervalence Electron Transfer," *J. Am. Chem. Soc.*, 114:8323-8325 (Oct. 7, 1992).

Kliner et al., "Comparison of Experimental and Theoretical Integral Cross Sections for $D + H_2(v=1, j=1) \to HD(v'=1, j') = H$," *J. Chem. Phys.*, 95:1648-1662 (Aug. 1, 1991).

Kliner et al., "$D + H_2(v=1, J=1)$: Rovibronic State to Rovibronic State Reaction Dynamics," *J. Chem. Phys.*, 92:2107-2109 (Feb. 1, 1990).

Kliner et al. "Effect of Indistinguishable Nuclei on Product Rotational Distributions: $H + HI \to H_2 + I$ reactions[a]," *J. Chem. Phys.*, 90:4625-4327 (Apr. 15, 1989).

Kliner et al., "Efficient second, third, fourth, and fifth harmonic generation of a Yb-doped fiber amplifier," *Optics Communications*, 210:393-398 (Sep. 15, 2002).

Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).

Kliner et al., "Efficient visible and UV generation by frequency conversion of a mode-filtered fiber amplifier," *Proc. of SPIE*, 4974:230-235 (Jul. 3, 2003).

Kliner et al., "Fiber laser allows processing of highly reflective materials," *Industrial Laser Solutions*, 31:1-9 (Mar. 16, 2016).

Kliner et al., "High-Power Fiber Lasers," *Photonics & Imaging Technology*, pp. 2-5 (Mar. 2017).

Kliner et al., "Laboratory Investigation of the Catalytic Reduction Technique for Detection of Atmospheric $NO_y$," *J. Geophys. Res.*, 102:10759-10776 (May 20, 1997).

Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).

Kliner et al., "Measurements of Ground-State OH Rotational Energy-Transfer Rates," *J. Chem. Phys.*, 110:412-422 (Jan. 1, 1999).

Kliner et al., "Mode-Filtered Fiber Amplifier," Sandia National Laboratories—Brochure, 44 pages (Sep. 13, 2007).

Kliner et al., "Narrow-Band, Tunable, Semiconductor-Laser-Based Source for Deep-UV Absorption Spectroscopy," *Optics Letters*, 22:1418-1420 (Sep. 15, 1997).

Kliner et al., "Overview of Sandia's fiber laser program," Proceedings of SPIE—The International Society for Optical Engineering, 6952:695202-1-695202-12 (Apr. 14, 2008).

Kliner et al., "Photodissociation and Vibrational Relaxation of $I_2^-$ in Ethanol," *J. Chem. Phys.*, 98:5375-5389 (Apr. 1, 1993).

Kliner et al., "Photodissociation Dynamics of $I_2^-$ in Solution," *Ultrafast Reaction Dynamics and Solvent Effects*, (American Institute of Physics, New York), pp. 16-35 (Feb. 1994).

Kliner et al., "Polarization-Maintaining Amplifier Employing Double-Clad, Bow-Tie Fiber," *Optics Lett.*, 26:184-186 (Feb. 15, 2001).

Kliner et al., "Power Scaling of Diffraction-Limited Fiber Sources," *Proc. of SPIE*, 5647:550-556 (Feb. 21, 2005).

Kliner et al., "Power Scaling of Rare-Earth-Doped Fiber Sources," *Proc. of SPIE*, 5653:257-261 (Jan. 12, 2005).

Kliner et al., "Product Internal-State Distribution for the Reaction $H + HI \to H_2 + I$," *J. Chem. Phys.*, 95:1663-1670 (Aug. 1, 1991).

Kliner et al., "The $D + H_2$ Reaction: Comparison of Experiment with Quantum-Mechanical and Quasiclassical Calculations," *Chem. Phys. Lett.*, 166:107-111 (Feb. 16, 1990).

Kliner et al., "The H+*para*-$H_2$ reaction: Influence of dynamical resonances on $H_2(v'= 1, j'= 1$ and 3) Integral Cross Sections," *J. Chem. Phys.*, 94:1069-1080 (Jan. 15, 1991).

(56) References Cited

OTHER PUBLICATIONS

Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," Optics Letters, 25:442-444 (Apr. 1, 2000).
Koplow et al., "Use of Bend Loss to Obtain Single-Transverse-Mode Operation of a Multimode Fiber Amplifier," *Conference on Lasers and Electro-Optics*, OSA Technical Digest (Optical Society of America, Washington, DC), p. 286-287 (May 7-12, 2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (Feb. 2007).
Kotlyar et al., "Asymmetric Bessel-Gauss beams," J. Opt. Soc. Am. A, 31:1977-1983 (Sep. 2014).
Kulp et al., "The application of quasi-phase-matched parametric light sources to practical infrared chemical sensing systems,"*Appl. Phys. B*, 75:317-327 (Jun. 6, 2002).
"Laser cutting machines," TRUMPF, available at: http://www.us.trumpf.com/en/products/machine-tools/products/2d-laser-cutting/innovative-technology/brightline.html, 9 pages, retrieved May 26, 2017.
Longhi et al., "Self-focusing and nonlinear periodic beams in parabolic index optical fibres," J. Opt. B: Quantum Semiclass. Opt., 6:S303-S308 (May 2004).
Maechling et al., "Sum Frequency Spectra in the C-H Stretch Region of Adsorbates on Iron,"*Appl. Spectrosc.*, 47:167-172 (Feb. 1, 1993).
McComb et al., "Pulsed Yb:fiber system capable of >250 kW peak power with tunable pulses in the 50 ps. to 1.5 ns. range," *Proc. of SPIE*, 8601:86012T-1-86012T-11 (Mar. 23, 2013).
Moore et al., "Diode-bar side pumping of double-clad fibers," *Proc. of SPIE*, 6453:64530K-1-64530K-9 (Feb. 20, 2007).
Neuhauser et al., "State-to-State Rates for the D + $H_2$(v = 1, j = 1) → HD(v', j') + H Reaction: Predictions and Measurements," *Science*, 257:519-522 (Jul. 24, 1992).
Office action from U.S. Appl. No. 15/607,399, dated Sep. 20, 2017, 25 pages.
Office action from U.S. Appl. No. 15/607,411, dated Sep. 26, 2017, 15 pages.
Office action from U.S. Appl. No. 15/607,410, dated Oct. 3, 2017, 32 pages.

Price et al., "High-brightness fiber-coupled pump laser development," *Proc. of SPIE*, 7583:758308-1-758308-7 (Feb. 2010).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: D + DI → $D_2$ + I," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).
Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).
Rinnen et al., "The H + $D_2$ Reaction: "Prompt" HD Distributions at High Collision Energies," *Chem. Phys. Lett.*, 153:371-375 (Dec. 23, 1988).
Rinnen et al., "The H + $D_2$ Reaction: Quantum State Distributions at Collision Energies of 1.3 and 0.55 eV," *J. Chem. Phys.*, 91:7514-7529 (Dec. 15, 1989).
Sanchez-Rubio et al., "Wavelength Beam Combining for Power and Brightness Scaling of Laser Systems," *Lincoln Laboratory Journal*, 20:52-66 (Aug. 2014).
Saracco et al., "Compact, 17 W average power, 100 kW peak power, nanosecond fiber laser system," *Proc. of SPIE*, 8601:86012U-1-86012U-13 (Mar. 22, 2013).
Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (Feb. 2008).
Sheehan et al., "Faserlaser zur Bearbeitung hochreflektierender Materialien (Fiber laser processing of highly reflective materials)," *Laser*, 3:92-94 (Jun. 2017).
Sheehan et al. "High-brightness fiber laser advances remote laser processing," *Industrial Laser Solutions*, 31:1-9 (Nov. 2, 2016).
Sun et al., "Optical Surface Transformation: Changing the optical surface by homogeneous optic-null medium at will," *Scientific Reports*, 5:16032-1-16032-20 (Oct. 30, 2015).
Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).
Tominaga et al., "Ultrafast Studies of Intervalence Charge Transfer," *Ultrafast Phenomena VIII*, (Springer-Verlag, New York), pp. 582-584 (1993).
Xiao et al., "Fiber coupler for mode selection and high-efficiency pump coupling," Optics Letters, 38:1170-1172 (Apr. 1, 2013).
Yaney et al., "Distributed-Feedback Dye Laser for Picosecond UV and Visible Spectroscopy," *Rev. Sci. Instrum*, 71:1296-1305 (Mar. 2000).
Yu et al., "1.2-kW single-mode fiber laser based on 100-W high-brightness pump diodes," *Proc. of SPIE*, 8237:82370G-1-82370G-7 (Feb. 16, 2012).

* cited by examiner

FIBER SOURCE WITH CASCADED GAIN STAGES AND/OR MULTIMODE DELIVERY FIBER WITH LOW SPLICE LOSS

CROSS REFERENCE TO RELATED APPLICATION

This application claims the benefit of U.S. Provisional Patent Application No. 62/138,926, filed Mar. 26, 2015, which is incorporated by reference herein in its entirety.

FIELD

The disclosure pertains to low loss optical couplings in high power optical sources.

BACKGROUND

Conventional continuous-wave fiber sources are typically designed to achieve high average powers, such as several 100s of W to several kW, in output beams exhibiting superior beam quality. In most cases, an output beam at or near the diffraction limit is highly desirable since it can be focused to a smaller spot resulting in higher irradiance capabilities. Due to various practical benefits, such beams are typically obtained with single-mode fiber laser system architectures using cascaded fiber gain stages. Even for cascaded fiber laser systems, however, single-mode performance is only achieved by making various tradeoffs with respect to cost, reliability, and performance.

Cascaded systems typically include a single-mode seed source, such as a single-mode fiber oscillator, one or more fiber oscillator or fiber amplifier stages coupled to the seed beam in order to scale its power, and a delivery fiber for delivering the beam to a target. In typical systems, the seed beam propagates in a core of a double clad fiber while pump light coupled into the cladding of the fiber provides an energy source for amplification of the seed beam. Subsequent amplification or delivery fiber stages use larger fiber cores to prevent the onset of detrimental non-linear effects associated with the beam and to increase pump absorption, but increasing fiber core size detrimentally allows the beam to propagate in various transverse modes higher than the preferred single, fundamental mode. Hence, various techniques are employed to maintain single-mode beam performance in large mode area (LMA) fibers.

One way to maintain single-mode performance between gain stages is to coil one or more stages, including the current, previous, or subsequent stage, so that the higher order modes are suppressed. Gain stages can also be carefully coupled to each other, such as with adiabatic fiber tapers, mode field adapters, or precision alignment so that the fundamental mode of the beam in a preceding gain stage is carefully matched or launched into the fundamental mode of the subsequent gain stage. A design in which the core diameter is simply increased with no other change in fiber parameters can cause excess splice loss because of modal mismatch between the fibers. Also, an increased core diameter can support additional modes, encouraging multimode propagation, unless the numerical aperture is decreased to compensate. In general, power coupling efficiency degradation or other optical loss associated with various gain stage couplings are necessary hindrances of achieving single-mode performance despite the increased cost of components (MFAs, thermal management) and attendant decrease in reliability from the additional components and lossy connections. A need therefore exists for innovation in high power continuous-wave systems without the aforementioned drawbacks.

SUMMARY

According to some examples of the disclosed technology, an apparatus includes an optical gain fiber having a core, a cladding surrounding the core, the core and cladding defining an optical gain fiber numerical aperture, and a multimode fiber having a core with a larger radius than a radius of the optical gain fiber core, a cladding surrounding the core, the core and cladding of the multimode fiber defining a multimode fiber stable numerical aperture that is larger than the optical gain fiber numerical aperture, the multimode fiber being optically coupled to the optical gain fiber so as to receive an optical beam propagating in the optical gain fiber and to stably propagate the received optical beam in the multimode fiber core.

According to additional examples of the disclosed technology, a method includes selecting core diameter and numerical aperture of a gain fiber and larger core diameter and larger numerical aperture of a receiving multimode fiber so that a beam parameter product of an optical beam coupled from the gain fiber to the receiving multimode fiber is above an unstable threshold and is stable, and optically coupling the gain fiber and receiving multimode fiber.

According to another aspect of the disclosed technology, a fiber laser system includes a fiber oscillator seed source for generating an optical beam, the fiber oscillator seed source having a core diameter and numerical aperture, at least one pump source optically coupled to the fiber oscillator seed source for optically pumping the fiber oscillator seed source, and a multimode fiber amplifier having a core diameter and numerical aperture, the multimode fiber amplifier being optically coupled to the fiber oscillator seed source with an optical splice so as to receive the optical beam, wherein the multimode fiber amplifier core diameter and numerical aperture are larger than the fiber oscillator seed source core diameter and numerical aperture so as to define a core diameter difference and numerical aperture difference, the differences being selected to provide substantially reduced optical loss and a stable beam parameter product.

The foregoing and other objects, features, and advantages of the invention will become more apparent from the following detailed description, which proceeds with reference to the accompanying figures which can include features not drawn to scale.

DETAILED DESCRIPTION

Figure 1:
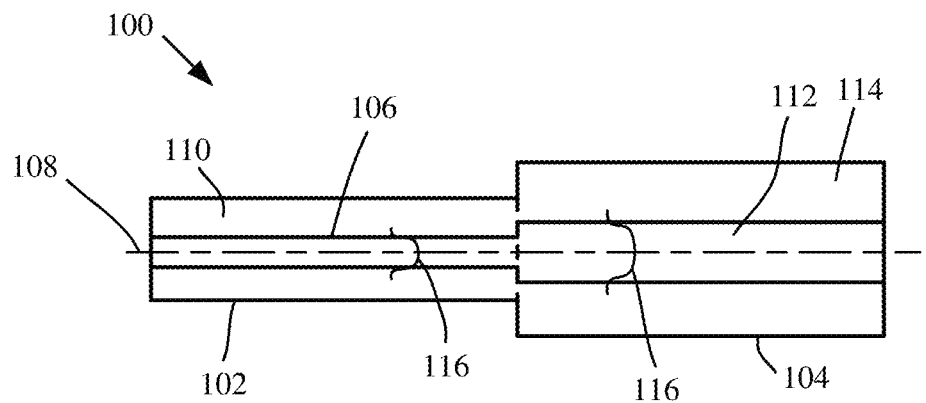
FIG. 1 is a schematic of an apparatus including optical fibers optically coupled with a splice.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam. In some examples, doped single-mode or doped multimode optical fibers are referred to as gain fibers, fiber oscillators, or fiber amplifiers, although it will be appreciated that such fibers typically include additional components as well, such as pump sources, pump couplers, and optical feedback elements, such as fiber Bragg gratings.

The term brightness is used herein to refer to optical beam power per unit area per solid angle. Selection of beam area and beam solid angle can produce pump beams that couple selected pump beam powers into one or more core or cladding layers of double, triple, or other multi-clad optical fibers.

FIG. 1 shows a cross-sectional schematic of a cascaded fiber laser apparatus 100 having an optical gain fiber 102 optically coupled to a multimode fiber 104 with an optical splice. The optical gain fiber 102 has a core 106 situated about an optical propagation axis 108 and a cladding 110 surrounding the core 106. The core and cladding have predetermined diameters or shapes defining corresponding cross-sectional areas. The core and cladding also have predetermined refractive indexes different from each other so as to define a numerical aperture associated with the core 106. Multimode fiber 104 includes a core 112 and cladding 114 having predetermined diameters or shapes defining cross-sectional areas, with the core 112 being larger than the core 106 of the optical gain fiber 102. The core and cladding of the multimode fiber 104 have predetermined refractive indexes different from each other so as to define a numerical aperture associated with the core 112 which is larger than the numerical aperture of the core 106. Optical gain fiber 102 and multimode fiber 104 can include one or more additional claddings or layers surrounding the claddings 110, 114.

An optical beam 116 propagating in the core 106 expands to fill the larger core 112 and to excite additional transverse modes associated with the multimode fiber 104. The amount by which the numerical aperture of the core 112 of the multimode fiber 104 exceeds the numerical aperture of the core 106 of the optical gain fiber 102 is selected so that an optical loss associated with the optical coupling of the spliced fibers 102, 104 is substantially reduced. In suitable examples, such substantial reduction corresponds to a low optical loss below 0.5% of total optical power of an optical beam transiting the optical coupling, though in additional examples such optical loss can be reduced to below 0.2%, 0.05%, or lower. An apparatus such as the apparatus 100 having optical gain fiber numerical apertures that are greater than or equal to multimode fiber numerical apertures may produce various desirable optical beam features (such as preservation of fundamental mode propagation) but also exhibit an optical loss associated with the optical coupling that varies according to selected fiber parameters but is generally from a few percent to several percent. For high power optical beams, including, for example, beam powers of several hundred watts to several kilowatts, a few percent loss can lead to premature degradation or failure of laser system components and an undesirable performance reduction, particularly for cascaded systems in which optical loss accumulates and compounds across multiple splices.

Optical losses for apparatuses such as the apparatus 100 can vary based on selected fiber parameters, such as with (but without limitation) the wavelength of the optical beam 116, the use of different optical fiber compositions and structures, or with different splicing tools used to generate the optical coupling splice. In general, in an optical coupling of a multimode fiber to a gain fiber, increases in multimode fiber numerical aperture above gain fiber numerical aperture are associated with minimal reduction in optical loss unless a threshold multimode numerical aperture or multimode fiber to gain fiber numerical aperture difference is exceeded. At such a loss threshold, a substantial reduction in optical loss is typically achieved. Additional reductions in optical loss can be obtained by further increasing multimode fiber numerical aperture, but generally with diminishing returns. It will be appreciated that low-loss multimode fiber numerical apertures can also be selected and the optical gain fiber core numerical aperture can be adjusted relative to the selected larger multimode fiber numerical aperture to achieve suitable low-loss optical coupling.

The numerical aperture of the core 112 is also selected so that a beam parameter product (bpp) associated with the optical beam is stable as opposed to unstable. Unstable numerical apertures produce optical beams with unstable bpps that are variable from apparatus to apparatus as fiber parameters, such as refractive indexes, shapes, diameters, splice positions, etc., for the optical gain fiber, multimode fiber, or other components vary according to normal tolerances. In general, such variable or unstable bpps associated with unstable numerical apertures are also higher, and therefore less desirable, than a bpp of the optical beam 116 in the multimode fiber 104 having a stable core numerical aperture. In suitable examples, stable or constant bpps associated with stable numerical apertures vary less than about 5%, 2%, 1%, or 0.5% from apparatus to apparatus according to normal manufacturing tolerances. Unstable numerical apertures can be observed that produce bpps which vary by greater than about 5%, 10%, 20%, 50%, or more between apparatuses based on a target bpp. Unstable numerical apertures can also produce unstable bpps that vary undesirably or unpredictably during operation of a particular apparatus, including at a selected output power or range of output powers. In some examples, an unstable bpp can vary by greater than about 5%, 10%, 20%, 50%, or more during operation of a laser apparatus.

Once a stable, low-loss numerical aperture, or numerical aperture difference, is obtained, as mentioned above, a smaller decrease in optical loss is achieved as the optical loss for the optical coupling approaches zero or other loss floor for each unit increase in multimode fiber numerical aperture or corresponding numerical aperture difference. Increasing numerical aperture in the multimode fiber (or decreasing the numerical aperture of the optical gain fiber) also tends to become less practical. For example, available materials to vary numerical aperture can limit the extent to which refractive index may be increased or decreased, or other fiber parameters, such as numerical apertures associated with the optical gain fiber or multimode fiber claddings 110, 114 can limit the extent of the selected difference between optically coupled core numerical apertures. An achievable stable multimode fiber numerical aperture can be selected in view of various laser parameters or constraints.

The stable multimode fiber numerical aperture, or the numerical aperture difference, can also be selected so that a numerical aperture margin is provided which allows the apparatus 100 to maintain a stable bpp or other stable characteristics of the optical beam 116 associated with the optical coupling as fiber parameters vary according to normal tolerances. In some examples, a stable multimode fiber numerical aperture is selected with a numerical aperture margin which is within 0.5%, 1%, 2%, 5%, 10%, 20%, or 50% of the stable multimode fiber numerical aperture. In other examples, a stable multimode fiber numerical aperture is selected with a margin of 0.01 $\Delta NA$, 0.1 $\Delta NA$, 0.5 $\Delta NA$, 1 $\Delta NA$, or 5 $\Delta NA$ above a multimode fiber numerical aperture value that is borderline stable or that just becomes stable. It will be appreciated that stable optical couplings with numerical aperture margin can also be obtained by adjusting an optical gain fiber core numerical aperture, both core numerical apertures, or the difference between the core numerical apertures.

In representative examples, optical gain fiber 102 is a single-mode fiber having a core diameter which only allows propagation of the optical beam 116 in the fundamental transverse $LP_{01}$ mode. In a particular example, the optical gain fiber 102 having the core 106 doped with ytterbium, a corresponding lasing wavelength of the optical beam 116 can be about 1080 nm. For a corresponding core numerical aperture of 0.06 NA, single-mode behavior occurs for diameters of less than about 10 µm. In other examples, optical gain fiber 102 has a few mode core or an LMA core with a diameter larger than a single-mode fiber so that the core 106 may be capable of supporting higher order modes. The higher order modes can be suppressed in different ways, such as through coiling of the fiber 102, photonic crystal microstructures, chirally coupled core microstructures, etc., so as to allow propagation of the optical beam 116 substantially in the fundamental transverse $LP_{01}$ mode only. The higher order modes can also be allowed to propagate so that the optical beam 116 propagating in the optical gain fiber 102 is multimode.

In a particular example, the optical gain fiber 102 has a ytterbium doped core 106 with a corresponding lasing wavelength of about 1080 nm. With a core numerical aperture of 0.0805 NA and a core diameter of 13.2 µm, single-mode $LP_{01}$ optical beam characteristics can be obtained through coiling of the optical gain fiber 102. Depending on the characteristics of the laser system associated with apparatus 100, optical gain fiber can be situated as a fiber oscillator, providing optical gain through feedback between reflective elements, or as a fiber amplifier, generating optical gain without substantial feedback. It will be appreciated that optical gain fiber 102 can include one or more optical fiber elements optically coupled or spliced together such that the optical fiber element optically coupled to the multimode fiber 104 may be a passive section of the optical gain fiber 102.

In representative examples of apparatus 100, multimode fiber 104 is a multimode gain fiber or a multimode fiber without active dopants, such as a multimode delivery fiber. The actively doped multimode fiber 104 includes the core 110 with a diameter larger than the diameter associated with the core 106 of the optical gain fiber 102. The core 110 of the multimode gain fiber is doped to provide optical gain to the optical beam 116 received from the optical gain fiber 102. It will be appreciated that actively doped multimode fiber 104 can include one or more optical fiber elements optically coupled or spliced together such that the optical fiber element optically coupled to the optical gain fiber 102 may be a passive section of the actively doped multimode fiber 104. Multimode fiber 104 examples can include multimode delivery fibers which typically lack active dopants along the entire length. Delivery fibers are typically used to direct the high power optical beam 116 to a target work surface.

In a particular example, the core 110 of the multimode fiber 104 is doped with ytterbium to provide laser amplification at 1080 nm and the diameter of the core 110 is about 39.2 m. The numerical aperture of the core 110 is selected in relation to the numerical aperture of the core 106 so that the optically coupling of the optical gain fiber and multimode fiber is provided with low optical loss and so that the bpp of the optical beam 116 propagating in the multimode gain fiber is stable. A numerical aperture margin can be provided so that with fiber parameter variation within tolerances, different implementations of the apparatus 100 do not tend to operate with an unstable bpp. The diameters of the cores 106, 110 can also be adjusted to achieve a suitable numerical aperture or numerical aperture difference.

In a particular example, with the optical gain fiber 102 having a core numerical aperture of 0.0805 NA and a core diameter of 13.2 µm and providing the optical beam 116 at a wavelength of about 1080 nm, the multimode fiber 104 having a core numerical aperture of 0.10 and a core diameter of 39.2 um is optically coupled with a fusion splice to receive the optical beam 116 and to amplify the beam at 1080 nm. Little or no reduction in optical loss associated with the optical splice is observed for multimode fiber core numerical apertures less than about 0.09, the optical loss being about 2% of total optical beam power. Substantial reduction in optical loss is found for multimode fiber core numerical apertures greater than about 0.09 but variable bpp and other performance characteristics are found in the optical beam 116. At about 0.095, the multimode fiber core numerical aperture provides stable bpp for the optical beam 116 but normal variation in fiber parameters within tolerances from apparatus to apparatus can cause an apparatus to have an unstable bpp or other beam characteristics. At about 0.10, the multimode fiber core numerical aperture provides a loss very close to zero, with a stable bpp and with enough numerical aperture margin or buffer so that normal variation in fiber parameters for the optical gain fiber 102, multimode fiber 104, or other system components or operational characteristics, does not result in a significant number of variably performing apparatuses.

Figure 2:
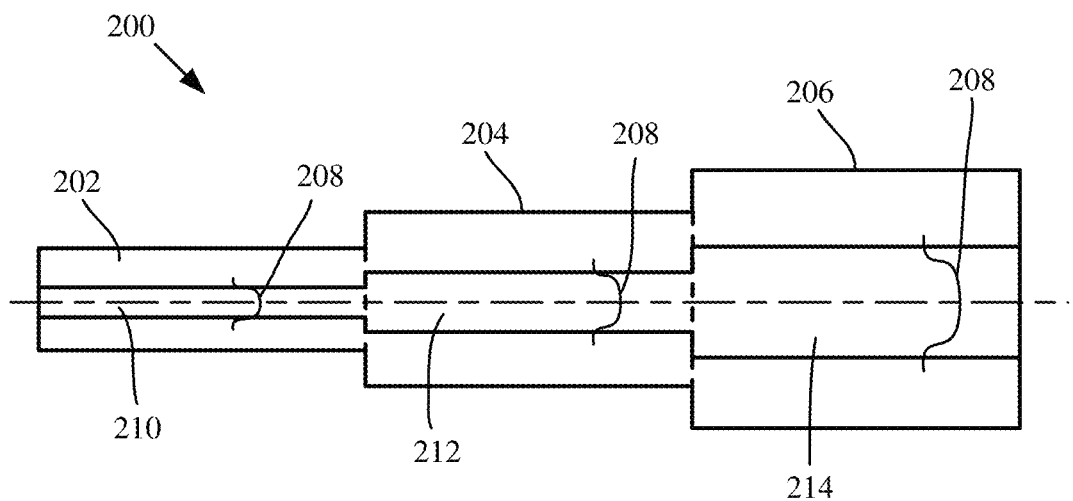
FIG. 2 is another schematic of an apparatus including optical fibers optically coupled with splices.

FIG. 2 shows a cross-sectional schematic of a fiber apparatus 200 which generally includes an optical gain fiber 202 optically coupled with a fusion splice to a multimode optical gain fiber 204 which is optically coupled with a fusion splice to a multimode fiber 206. An optical beam 208 is generated or amplified or both by propagation through the apparatus 200. The optical gain fiber 202 includes an active core 210 having a selected diameter and numerical aperture for generating or amplifying and also propagating the optical beam 208. Multimode optical gain fiber 204 includes an active core 212 having a selected diameter and numerical aperture which are larger than the core diameter and numerical aperture associated with the optical gain fiber 202. Multimode fiber 206 includes a core 214 having a selected diameter and numerical aperture which are larger than the core diameter and numerical aperture associated with the multimode optical gain fiber 204. Each core diameter and numerical aperture increase between adjacently optically coupled fibers is selected so that an optical loss associated with the optical coupling is substantially reduced and the bpp of the optical beam 208 is provided in a stable configuration in the downstream adjacent fiber. The selection of core and numerical aperture can also provide a variability margin that prevents the optical beam 208 from drifting into an unstable bpp range in view of fiber parameter variation according to normal tolerances in the manufacture of like apparatuses 200.

In a representative example, optical gain fiber 202 is a fiber oscillator situated to generate an optical beam substantially in the fundamental mode, the multimode optical gain fiber 204 is a multimode fiber amplifier situated to amplify the optical beam 208 received from the optical gain fiber 202, and the multimode fiber 206 is a multimode delivery fiber situated to receive the optical beam 208 which has been amplified by the optical gain fiber 204 and to deliver the beam 208 to a target. In various examples, optical gain fiber 202 can have a single-mode core, few-mode core, or a multimode core. In further examples, multimode fiber 206 can be an actively doped multimode fiber amplifier.

Figure 3:
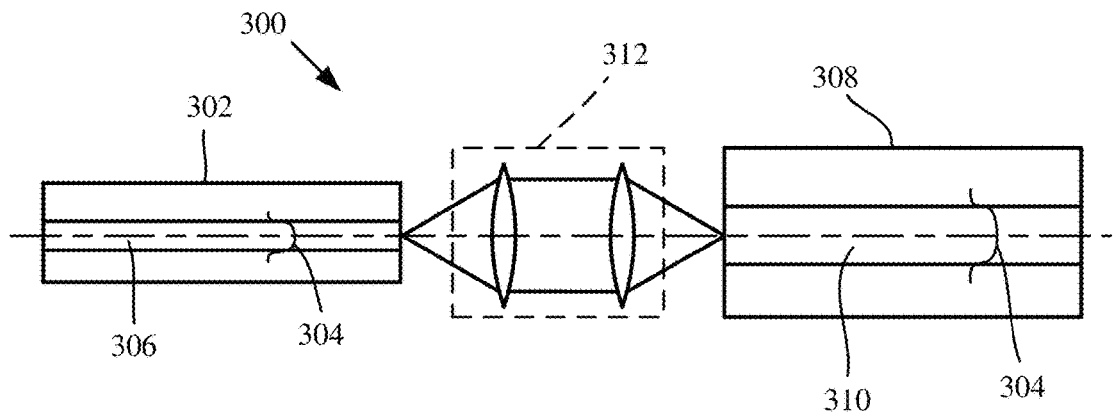
FIG. 3 is a schematic of an apparatus including optical fibers optically coupled with free space optics.

FIG. 3 shows a cross-sectional schematic of a fiber apparatus 300 which includes an optical gain fiber 302 situated to propagate an optical beam 304 in a core 306 thereof, a multimode optical fiber 308 situated to receive and propagate the beam 304 in a multimode core 310, and free-space optics 312 situated to receive the optical beam 304 from the optical gain fiber 302 and to couple the beam into the multimode core 310 of the multimode optical fiber 308. The diameters and numerical apertures of the cores 306, 310 are selected to substantially reduce optical loss that may be associated with the optical coupling of the beam 304 with the free-space optics 312 and to further provide the optical beam 304 with a stable bpp that varies minimally between apparatuses 300 given normal variation of fiber parameters according to specification tolerances.

Figure 4:
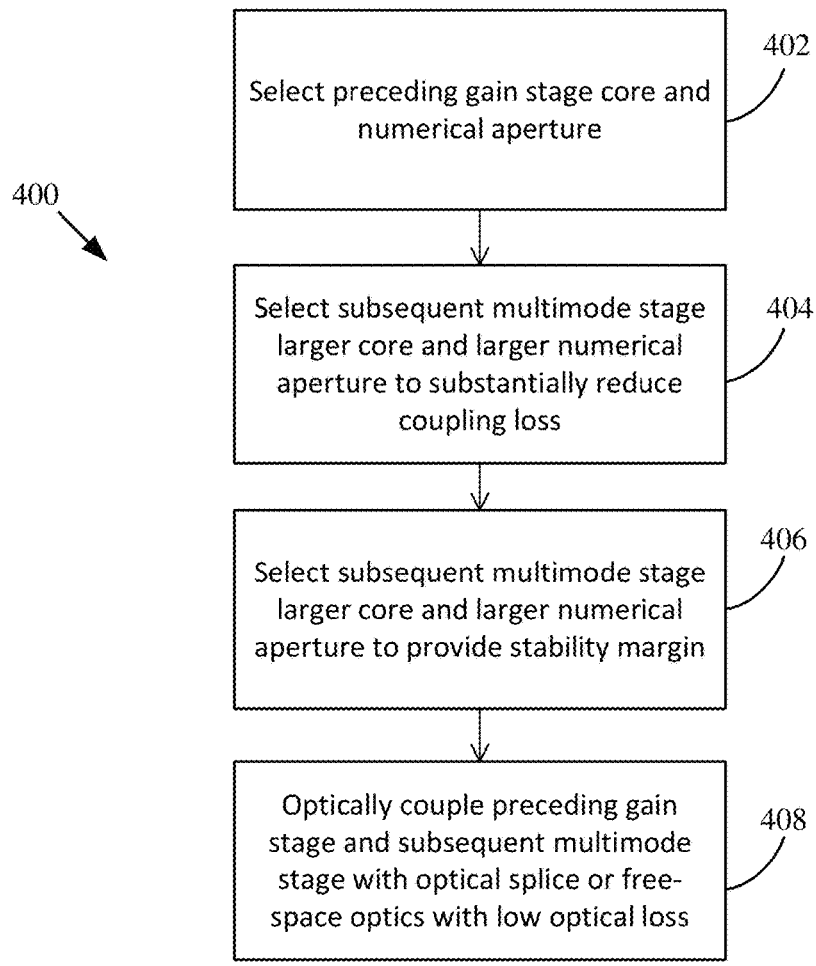
FIG. 4 is a flowchart of a method of reducing loss in an optical coupling between optical fibers.

In FIG. 4, an exemplary method 400 for providing a high power optical beam includes, at 402, selecting a preceding gain stage core diameter and core numerical aperture. At 404, a subsequent multimode stage core diameter and numerical aperture are selected which are larger than the core diameter and core numerical aperture of the preceding gain stage. The core diameters and numerical apertures are selected to provide a substantial reduction in coupling loss and stable optical beam characteristics, including bpp. The core diameters and numerical apertures can be further selected at 406 to provide a stability margin allowing repeatable low-loss and stable optical beam characteristics as fiber parameters may vary according to normal tolerances. At 408, the preceding gain stage and subsequent multimode stage are optically coupled via fusion splicing or free-space optics so that a high power optical beam is produced.

Figure 5:
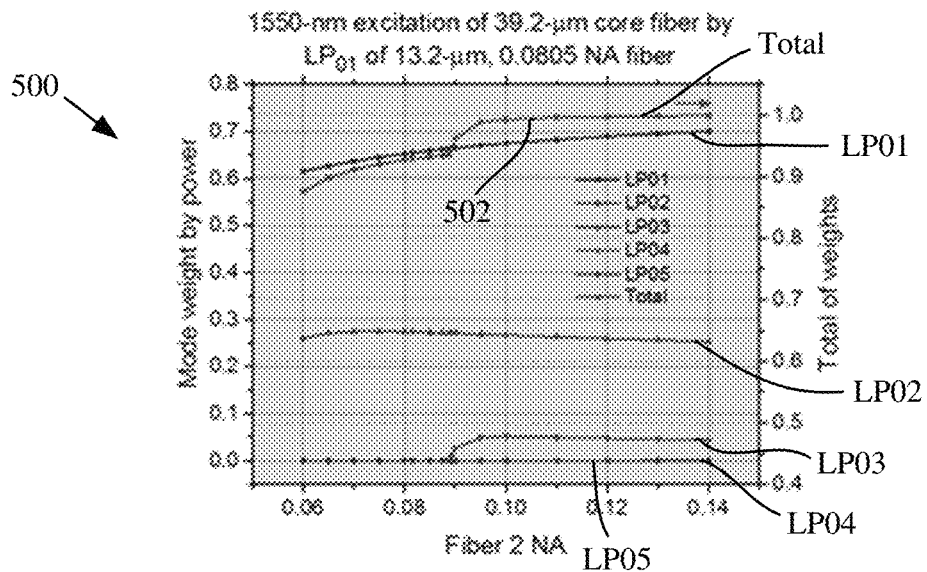
FIG. 5 is a plot of mode power content against numerical aperture of a receiving optical fiber.

FIG. 5 is a chart 500 depicting power of an optical beam for different numerical apertures of a multimode fiber spliced to and receiving the beam power from a preceding optical fiber. In particular, the preceding fiber propagates an optical beam at 1550 nm in the fundamental $LP_{01}$ mode through a core having a diameter of 13.2 µm and a core numerical aperture of 0.0805. The total optical beam power 502 in the multimode fiber with a core diameter of 39.2 µm is plotted against numerical aperture of the multimode fiber. When the core numerical aperture of the preceding fiber at 0.0805 is matched to the numerical aperture of the spliced multimode fiber receiving the optical beam, an optical coupling loss of around 7% is observed. It should be noted that for shorter wavelengths such optical coupling loss is typically lower, such as around 2%, and consequently more difficult to detect or more likely to be considered to be within a manufacturing tolerance.

As the core numerical aperture of the receiving multimode fiber is increased steadily to near 0.090 NA, a small decrease in optical loss is seen followed by a large decrease in optical loss from 0.090 NA to about 0.095 NA. The sudden decrease in optical loss at a threshold numerical aperture may be associated with a mode coupling threshold as the optical beam in the preceding fiber which can have fewer modes couples into the supported modes of the multimode fiber. For multimode fiber core numerical apertures above about 0.095 NA, diminishes to close to 0% optical loss. Also depicted in FIG. 5 are the various modal power contents for the modes of the optical beam propagating in the multimode fiber core for different multimode core numerical apertures.

Figure 6:
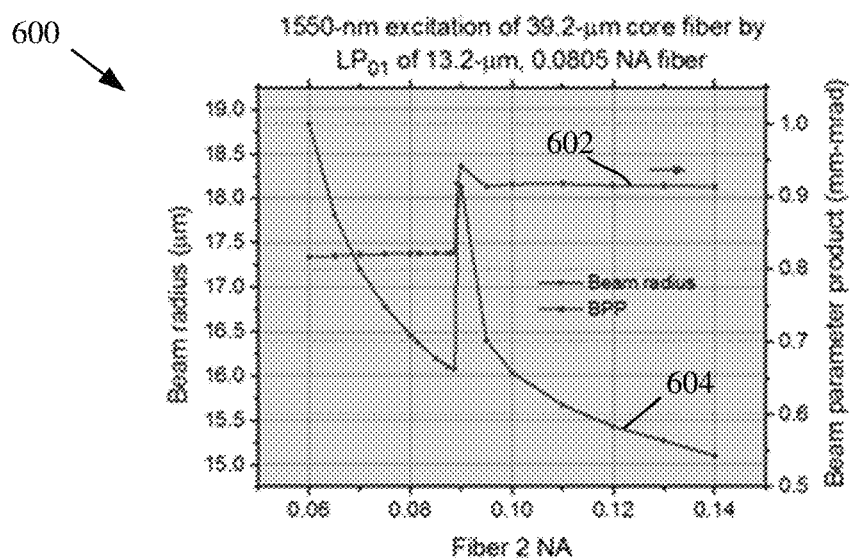
FIG. 6 is a plot of beam parameter product and beam radius against numerical aperture of a receiving fiber.

FIG. 6 is a chart 600 depicting bpp 602 and beam radius 604 for the optical beam in the multimode fiber, as described for FIG. 5, across a similar range of core numerical apertures of the multimode fiber. As numerical aperture of the multimode fiber core increases past a numerical aperture matched to the numerical aperture of the preceding fiber, bpp remains unchanged until the mode coupling threshold is reached. As the numerical aperture increases past the threshold, highly variable bpp and beam radius fluctuations are observed until a stable numerical aperture is reached. Once the stable numerical aperture is selected beam radius begins to decrease more smoothly without fluctuating behavior and the bpp becomes consistent with increasing multimode fiber core numerical aperture.

Figure 7:
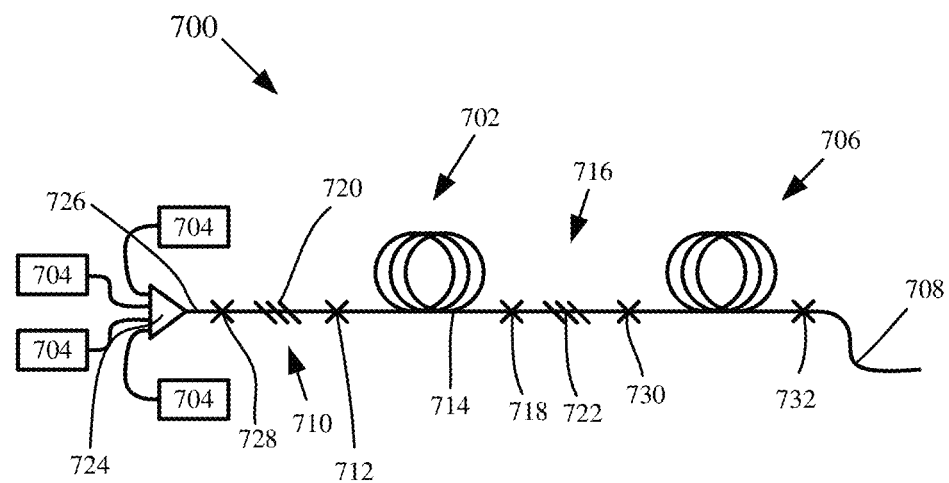
FIG. 7 is a schematic of a fiber laser system.

FIG. 7 is a schematic of a fiber laser system 700 which includes a fiber oscillator 702, a plurality of pump sources 704, a multimode fiber amplifier 706, and a delivery fiber 708. The fiber oscillator 702 gain fiber includes a high reflecting (HR) fiber portion 710 optically coupled with a splice 712 to an end of an actively doped fiber portion 714 and partial reflecting (PR) fiber portion 716 optically coupled with a splice 718 to an opposite end of the actively doped fiber portion 714. The HR fiber portion 710 includes a fiber Bragg grating (FBG) 720 written in its core, which can be active or passive, and which predominantly reflects light at a lasing wavelength associated with the actively doped fiber portion 714. HR reflectivities are typically at least about 80%, 95%, 99%, 99.9%, or higher. The PR fiber portion 716 includes an FBG 722 written in its core, which can be active or passive, and which both reflects and transmits light at the lasing wavelength. PR reflectivities can vary considerably depending on system gain requirements, such as being below 20%, 50%, 80%, 95%, or 99%. The pump sources 704 are optically coupled to a pump combiner 724 which combines and couples the light from the pump sources into a pump delivery fiber 726. The pump delivery fiber 726 is coupled to the HR fiber portion 710 via an optical splice 728. The pump light provides energy for laser feedback and amplification in the fiber oscillator and amplifier 702, 706.

The PR fiber portion 716 of the fiber oscillator 702 is optically coupled to the fiber amplifier 706 with an optical splice 730. A seed beam generated in the fiber oscillator 702 is thereby coupled into the fiber amplifier 706 for substantial amplification. The fiber amplifier 706 is optically coupled to the delivery fiber 708 at an optical splice 732. The delivery fiber 708 receives the amplified beam from the fiber amplifier 706 and directs the beam to a target (not shown). At optical splices 730, 732, the optical fiber cores step up in diameter typically resulting in an amount of undesirable optical loss. Numerical apertures of adjoining fibers at such optical splices are chosen to have a predetermined difference with the larger core downstream fiber having a larger numerical aperture than the upstream fiber. The numerical aperture difference is selected so as to provide the optically coupled beam with a substantially reduced loss, so that a propagating optical beam experiences a reduction in optical power of 0.5% or less in some examples. The numerical aperture difference can also be selected so that the bpp of the optically coupled beam does not experience substantial variability. A numerical aperture margin can be provided so that variation between manufactured fiber laser systems 700 due to manufacturing tolerances can buffer against the possibility of the characteristics of the beam, such as bpp or beam radius, of a system 700 of being variable or out of tolerance. Such margin can be selected to be below a numerical aperture difference that can cause a beam radius reduction that would exacerbate nonlinear effects or below a numerical aperture difference that is impractical due to limitations associated with fiber doping to achieve different numerical apertures or other system or fiber constraints such as cladding numerical apertures.

In view of the many possible embodiments to which the principles of the disclosed technology may be applied, it should be recognized that the illustrated embodiments are only representative examples and should not be taken as limiting the scope of the disclosure. Alternative specifically addressed in these sections are merely exemplary and do not constitute all possible alternatives to the embodiments described herein. For instance, various components of systems described herein may be combined in function and use. We therefore claim as our invention all that comes within the scope and spirit of these claims.

We claim:

1. An apparatus, comprising:
an optical gain fiber having a core, a cladding surrounding the core, the core and cladding defining an optical gain fiber numerical aperture; and
a multimode fiber having a core with a larger radius than a radius of the optical gain fiber core, a cladding surrounding the core, the core and cladding of the multimode fiber defining a multimode fiber numerical aperture that is larger than the optical gain fiber numerical aperture, the multimode fiber being optically coupled to the optical gain fiber so as to receive an optical beam propagating in the optical gain fiber and to stably propagate the received optical beam in the multimode fiber core.

2. The apparatus of claim 1, wherein the optical coupling is associated with an optical loss.

3. The apparatus of claim 2, wherein the optical gain fiber numerical aperture and the multimode fiber numerical aperture are selected so that the optical loss associated with the optical coupling of the optical beam from the optical gain fiber to the multimode fiber is lower than an optical loss associated with an optical coupling of the optical beam from the optical gain fiber to a multimode fiber having a core numerical aperture that is equal to the optical gain fiber numerical aperture.

4. The apparatus of claim 1, wherein the optical gain fiber numerical aperture and the multimode fiber numerical aperture are selected so that their difference exceeds a numerical aperture difference associated with a variable beam parameter product of the optical beam propagating in the multimode fiber.

5. The apparatus of claim 4, wherein the exceeding numerical aperture difference is less than about 5%, 10%, 20%, 50%, 100%, or 200% of the optical gain fiber numerical aperture.

6. The apparatus of claim 1, wherein the multimode fiber is optically coupled to the optical gain fiber with a fusion optical splice.

7. The apparatus of claim 1, wherein the multimode fiber is coupled to the optical gain fiber with free-space optics.

8. The apparatus of claim 1, wherein the optical gain fiber is a fiber oscillator.

9. The apparatus of claim 8, wherein the fiber oscillator includes a passive highly reflective FBG fiber portion, an active oscillator fiber portion having an upstream end spliced to the passive highly reflective FBG fiber portion, and a passive partially reflective FBG fiber portion having an upstream end spliced to a downstream end of the active oscillator fiber portion and having a downstream end spliced to the multimode fiber.

10. The apparatus of claim 8, wherein the fiber oscillator is a single-mode fiber oscillator.

11. The apparatus of claim 1, wherein the multimode fiber is a multimode fiber amplifier.

12. The apparatus of claim 1, wherein the multimode fiber is a multimode optical beam delivery fiber.

13. The apparatus of claim 1, further comprising:
wherein the multimode fiber includes a first multimode fiber and a second multimode fiber, wherein the second multimode fiber has a core with a larger diameter than a diameter of the first multimode fiber core, a cladding surrounding the second multimode fiber core, and an associated core numerical aperture being larger than a multimode fiber core numerical aperture of the first multimode fiber, the second multimode fiber being optically coupled to the first multimode fiber so as to receive and propagate the optical beam in the larger core of the second multimode fiber with low optical loss associated with the optical coupling of the first and second multimode fibers.

14. The apparatus of claim 13, wherein the optical gain fiber is a single-mode fiber oscillator, the first multimode fiber is a multimode fiber amplifier, and the second multimode fiber is a multimode optical beam delivery fiber.

15. The apparatus of claim 2, wherein the low optical loss is below about 0.5%, 0.2%, 0.1%, or 0.05% of total power of the optical beam.

16. The apparatus of claim 1, wherein the optical gain fiber and multimode fiber are fiber amplifiers.

17. The apparatus of claim 1, wherein the optical gain fiber core and multimode fiber core numerical apertures are selected to provide a low variation increase in beam parameter product of the optical beam across a fiber parameter variation within corresponding fiber parameter tolerances.

18. The apparatus of claim 2, wherein the optical loss is associated with excitation by the optical beam of higher order modes of the multimode fiber.

19. The apparatus of claim 1, wherein the beam radius of the optical beam in the multimode fiber is associated with a stable increase over the beam radius of the optical beam in the optical gain fiber.

20. The apparatus of claim 2, wherein the larger multimode fiber core numerical aperture is selected to have a loss margin providing the optical loss across a fiber parameter variation within corresponding fiber parameter tolerances.

21. A method, comprising:
selecting the core radius and the numerical aperture of the optical gain fiber of the apparatus of claim 1 and the larger core radius and the larger numerical aperture of the multimode fiber so that a beam parameter product of an optical beam coupled from the optical gain fiber to the multimode fiber is above an unstable threshold; and
optically coupling the optical gain fiber to the multimode fiber.

22. The method of claim 21, wherein the optical gain fiber is a master oscillator and the multimode fiber is a multimode fiber amplifier.

23. The method of claim 21, wherein the optical beam is coupled so that an optical loss associated with the coupling is below about 0.5% of a total power of the coupled optical beam.

24. The method of claim 21, wherein the multimode fiber is a delivery fiber.

25. A fiber laser system, comprising:
a fiber oscillator seed source for generating an optical beam, the fiber oscillator seed source having a core diameter and numerical aperture;
at least one pump source optically coupled to the fiber oscillator seed source for optically pumping the fiber oscillator seed source; and
a multimode fiber amplifier having a core diameter and numerical aperture, the multimode fiber amplifier being optically coupled to the fiber oscillator seed source with an optical splice so as to receive the optical beam;
wherein the multimode fiber amplifier core diameter and numerical aperture are larger than the fiber oscillator seed source core diameter and numerical aperture so as to define a core diameter difference and numerical aperture difference, the differences being selected to provide substantially reduced optical loss and a stable beam parameter product.

* * * * *